US 8,275,268 B2

(12) United States Patent
Kazutaka

(10) Patent No.: US 8,275,268 B2
(45) Date of Patent: Sep. 25, 2012

(54) OPTICAL TRANSMISSION SYSTEM AND OPTICAL REPEATER

(75) Inventor: Shimoosako Kazutaka, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 13/292,020

(22) Filed: Nov. 8, 2011

(65) Prior Publication Data

US 2012/0051744 A1    Mar. 1, 2012

Related U.S. Application Data

(62) Division of application No. 12/281,404, filed as application No. PCT/JP2007/056883 on Mar. 29, 2007, now Pat. No. 8,126,336.

(30) Foreign Application Priority Data

| Mar. 31, 2006 | (JP) | 2006-0100839 |
| Mar. 31, 2006 | (JP) | 2006-0100840 |
| Jun. 6, 2006 | (JP) | 2006-0157696 |
| Jun. 7, 2006 | (JP) | 2006-0158320 |

(51) Int. Cl.
*H04B 10/00* (2006.01)

(52) U.S. Cl. ............ 398/173; 398/11; 398/18; 398/30; 398/62; 398/181

(58) Field of Classification Search ............ 398/11, 398/18, 30, 62, 173
See application file for complete search history.

(56) References Cited

U.S. PATENT DOCUMENTS

| 6,870,836 B1 | 3/2005 | Dyke et al. |
| 7,706,688 B2 | 4/2010 | Boudreault et al. |
| 7,783,201 B2 * | 8/2010 | Miura et al. .................. 398/173 |
| 2006/0113843 A1 * | 6/2006 | Beveridge ...................... 307/43 |

FOREIGN PATENT DOCUMENTS

| JP | H4-213928 | 8/1992 |
| JP | 2000-312189 | 7/2000 |
| JP | 2002-271271 | 9/2002 |
| JP | 2004-289863 | 10/2004 |

OTHER PUBLICATIONS

ISR for PCT Application WO 2007/119589A1 dated Jun. 5, 2007.

* cited by examiner

*Primary Examiner* — Dung Nguyen

(74) *Attorney, Agent, or Firm* — Turocy & Watson, LLP

(57) ABSTRACT

An optical repeater connected to an optical transmission line between an optical network unit having an optical network unit (ONU) function on the side of a subscriber and an optical line termination (OLT) on the side of a center includes first electrical/optical conversion means connected to a first optical transmission line on the side of the center, a second electrical/optical conversion means connected to a second optical transmission line on the side of the subscriber, and transmission means connected between the first electrical/optical conversion means and the second electrical/optical conversion means to transmit an optical repeater supervisory signal between the optical transmission lines.

13 Claims, 15 Drawing Sheets

OPTICAL TRANSMISSION SYSTEM AND OPTICAL REPEATER

CROSS-REFERENCE TO RELATED APPLICATIONS

This application is a divisional application of U.S. patent application Ser. No. 12/281,404, filed Sep. 2, 2008, entitled "OPTICAL TRANSMISSION SYSTEM AND OPTICAL REPEATER," which is a US national stage filing of Patent Cooperation Treaty (PCT) Application Serial No. PCT/JP2007/056883 (WO2007/119589), filed Mar. 29, 2007, which claims priority to Japanese Patent Application No. 2006-0158320, filed Jun. 7, 2006, Japanese Patent Application No. 2006-0157696, filed Jun. 6, 2006, Japanese Patent Application No. 2006-0100839, filed Mar. 31, 2006 and Japanese Patent Application No. 2006-0100840, filed Mar. 31, 2006, the entireties of each of which applications are incorporated herein by reference.

TECHNICAL FIELD

The present invention relates to an optical transmission system and an optical repeater, and more particularly, to a passive optical network (PON) type optical transmission system and an optical repeater thereof.

BACKGROUND ART

In optical networks such as fiber to the home (FTTH), cable television (CATV), etc., a PON type optical transmission system can be used in which an optical transmission line connected to a center is split by a passive splitter and the split optical transmission lines are laid on a plurality of subscribers. This optical transmission system is also called a Passive Double Star (PDS) system.

In such an optical transmission system, the splitter is connected to an optical fiber drawn out to users from an optical subscriber unit (OSU) in an optical line termination (OLT) of the center, and optical network units (ONUs) of a plurality of users are coupled to a plurality of optical transmission lines split by the splitter through optical fibers.

In a PON type or a PDS type optical transmission system in which an OLT is connected to a plurality of ONUs through optical fibers and a splitter, it is known that an optical repeater can be connected to the optical transmission line between OLT and the splitter in order to lengthen the optical transmission line.

Furthermore, a system can be constructed in such a manner that a multiplexer/demultiplexer (MUX/DEMUX) and an optical repeater are connected to an existing optical transmission system to perform wavelength division multiplexing (WDM), as disclosed in Japanese Patent Laid-Open Publication No. 2002-261697. The optical repeater has a configuration shown in FIG. 15.

A wavelength converter 101 includes first and second 3 dB couplers 102 and 103 respectively mounted at input and output stages of the OLT and the ONU. A downstream signal system includes a light-receiving element 104, a receiving circuit 105, a driving circuit 106, a light-emitting element 107, and an isolator 108, which are connected in order between the first and second 3 dB couplers 102 and 103 toward the signal transfer direction. An upstream signal system includes a light-receiving element 109, a receiving circuit 110, a driving circuit 111, a light-emitting element 112, and an isolator 113, which are connected in order between the first and second 3 dB couplers 102 and 103 toward the signal transfer direction.

In the converter, the light-receiving elements 104 and 109 respectively convert optical signals output from the first and second 3 dB couplers 102 and 103 into electrical signals, and the receiving circuits 105 and 110 perform a 3R or 2R process on the electrical signals. Then, the driving circuits 106 and 111, the light-emitting elements 107 and 112 convert the signals subjected to the 3R or 2R operation into optical signals and output the converted optical signals to the isolators 108 and 113. Here, 3R represents reshaping, regeneration and retiming functions and 2R represents regeneration and retiming functions.

Technical Problem

Generally, an optical repeater of CATV is located outdoors at a distance from the OLT, and supervision of the optical repeater is required in order to cope with accidents, such as a variation in the output power of a light-emitting element included in the optical repeater due to the surrounding temperature difference, trouble in a relaying operation due to a power failure, trouble regarding the voltage variation in a power supply unit of the optical repeater, trouble regarding the door opening of a box, trouble regarding increase in the internal temperature of the optical repeater, water leakage into the optical repeater, etc.

In order to supervise the optical repeater, a method of attaching an electric circuit for supervising the optical repeater and connecting the electric circuit for supervising to an electrical communication line can be used. However, a large-scale construction is required to build a new electrical communication line for supervising the optical repeater resulting at an increase of cost. Furthermore, supervising of the optical repeater is not practical because building the new electric communication line is not affordable.

Regarding the matter, for an optical transmission system, optical multiplexing of an optical signal that has a wavelength for the supervising of the optical repeater can be performed for the optical signal having the wavelength generally used in the optical transmission system. However, this requires an optical wavelength multiplexer and cannot be employed easily in terms of cost and space.

The object of the present invention is to provide an optical transmission system and an optical repeater to which a supervisory function can be easily introduced from the viewpoint of cost and workability.

Technical Solution

To accomplish the above object, in a first aspect thereof, the present invention is related to an optical repeater connected to an optical transmission line between at least one subscriber side optical line termination having an ONU function and a center side optical line termination, which comprises a first electrical/optical conversion means connected to a first optical transmission line of said center side optical line termination for optical/electrical conversion as well as electrical/optical conversion, a second electrical/optical conversion means connected to a second optical transmission line of said subscriber side optical line termination for optical/electrical conversion as well as electrical/optical conversion, and a transmission means connected between said first electrical/optical conversion means and said second electrical/optical conversion mean to transmit an optical repeater supervising signal between the optical transmission lines.

In a second aspect thereof, the present invention is related to an optical repeater according to the first aspect, wherein the transmission means comprises an electric line interconnecting the first electrical/optical conversion means and the second electrical/optical conversion means, and an ONU function section to input/output electrical signal to/from the electric line through an electrical signal connector.

In a third aspect thereof, the present invention is related to an optical repeater according to the second aspect, wherein the ONU function section has the same function as that of the ONU on the subscriber side optical line termination.

In a fourth aspect thereof, the present invention is related to an optical repeater according to the second or the third aspect, wherein the electric line includes a first electric line for transferring the electrical signal from the first electrical/optical conversion means to the second electrical/optical conversion means to the downward direction and a second electric line for transferring the electrical signal from the second electrical/optical conversion means to the first electrical/optical conversion means to the upward direction, and the electrical signal connector includes a first electrical signal connector for branching the electrical signal transferred through the first electric line into the first electrical/optical conversion means and the ONU function section and a second electrical signal connector for multiplexing an electrical signal output from the ONU function section with the electrical signal transferred through the second electric line.

In a fifth aspect thereof, the present invention is related to an optical repeater connected to an optical transmission line between at least one subscriber side optical line termination and a center side optical line termination, which comprises an optical signal processor connected between a first optical transmission line on the side of the center and a second optical transmission line on the side of subscriber, an optical multiplexer/demultiplexer connected to the first or second optical transmission line, and an optical network unit for supervising connected to the first or second optical transmission line through the optical multiplexer/demultiplexer to input/output electrical signal for supervising.

In a sixth aspect thereof, the present invention is related to an optical repeater according to the fifth aspect, wherein the optical network unit for supervising has the same function as that of the subscriber side optical line termination.

In a seventh aspect thereof, the present invention is related to an optical repeater according to the fifth or the sixth aspect, wherein the optical network unit for supervising is connected to either the first optical transmission line or the second optical transmission line through the optical multiplexer/demultiplexer.

In an eighth aspect thereof, the present invention is related to an optical repeater according to any one of the fifth to the seventh aspect, wherein the optical signal processor comprises a first electrical/optical conversion means connected to the first optical transmission line on the side of the center for optical/electrical conversion as well as electrical/optical conversion, a second electrical/optical conversion means connected to the second optical transmission line on the side of the subscriber for optical/electrical conversion as well as electrical/optical conversion, and a electric line connected between the first electrical/optical conversion means and the second electrical/optical conversion mean to transmit an electrical signal.

In a ninth aspect thereof, the present invention is related to an optical repeater according to any one of the fifth to the eighth aspect, wherein at least one of the first and second electrical/optical conversion means includes a processing circuit for reshaping, regeneration and retiming processes.

In a tenth aspect thereof, the present invention is related to an optical transmission system comprising the optical repeater according to any one of the first to the ninth aspect, a first optical network unit in the center side optical line termination, which is connected to the optical repeater through the first optical transmission line, and a second optical network unit in the subscriber side optical line termination, which is connected to the optical repeater through the second optical transmission line.

In an eleventh aspect thereof, the present invention is related to an optical transmission system according to the tenth aspect, wherein a plurality of the second optical network units is connected to the second optical transmission line through an optical multiplexer/demultiplexer.

In a twelfth aspect thereof, the present invention is related to an optical transmission system according to the tenth or eleventh aspect, wherein a plurality of the optical repeater is connected through an optical transmission line.

Advantageous Effects

Since the optical transmission system according to the present invention has a first electrical/optical conversion means connected to a first optical transmission line of the center side optical line termination, a second electrical/optical conversion means connected to a second optical transmission line of the subscriber side optical line termination, and a transmission means connected between the first and the second electrical/optical conversion means to transmit an optical repeater supervisory signal, the optical repeater can be supervised without laying a new line for supervising.

Furthermore, according to another aspect of the present invention, since the supervisory function section that transmits the supervisory signal for supervising the optical repeater is mounted in the optical repeater and connected to the optical transmission line through the optical network unit, there is no need to lay an additional electric communication line for supervising the optical repeater or to use an optical signal with a wavelength which is different from wavelengths generally used for optical transmission. In addition, the supervisory signal for the optical repeater can be transmitted to/from the optical line termination without affecting the operation of the existing system.

DETAILED DESCRIPTION

First Embodiment

Hereinafter, embodiments of the present invention will now be explained in detail with reference to the attached drawings.

Figure 1:
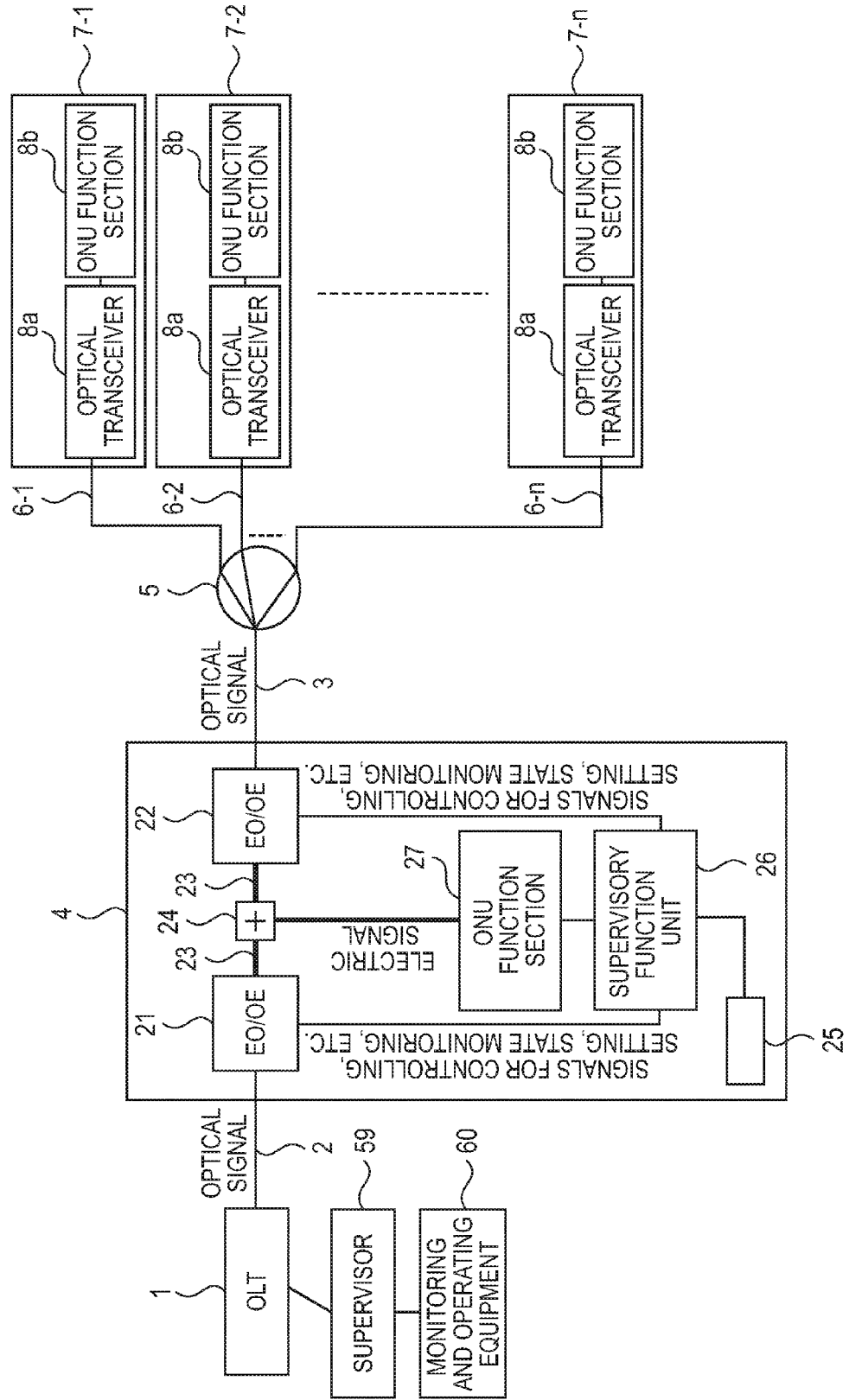
FIG. 1 illustrates a configuration of an optical transmission system according to a first embodiment of the present invention.

FIG. 1 illustrates a configuration of a PON type optical transmission system according to a first embodiment of the present invention.

Referring to FIG. 1, an optical transmission line consisting of optical fibers 2 and 3 connected to center side optical line termination (OLT) 1 such as CATV is coupled to an optical coupler 5 through an optical repeater 4. A plurality of optical transmission lines branched by the optical coupler (optical multiplexer/demultiplexer) 5 are respectively connected to optical network units (ONUs) 7-1 to 7-n (n: natural numbers) of a plurality of subscribers through optical fibers 6-1 to 6-n (n: natural numbers). The ONUs 7-1 to 7-n respectively consist of optical transceivers 8a and ONU function sections 8b.

Generally, the term "ONU" includes the function of an optical transceiver. However, in this specification, the explanation of ONU will be divided into two parts, i.e., optical transceiver and ONU function.

As the OLT 1 and the ONUs 7-1 to 7-n, for example, Gigabit Ethernet™ PON (GEPON) conforming to IEEE802.3ah of Ethernet First Mile (EFM) standard or Gigabit Passive Optical Network (GPON) conforming to ITU-T recommendation G.984.x, etc., namely, a device suitable for the regulations is selected.

The optical repeater 4 includes a first EO/OE converter (electrical/optical conversion means) 21 connected to the optical fiber 2 on the side of the OLT 1, a second EO/OE converter (electrical/optical conversion means) 22 connected to the optical fiber 3 on the side of the optical coupler 5, electric lines 23 transferring electrical signals between the first EO/OE converter 21 and the second EO/OE converter 22, an electrical signal connector 24 connected to the electric lines 23, various devices 25 such as a door opening/closing sensor, a temperature sensor, a power voltage sensor, an alarm, a heater, etc. attached to the optical repeater 4, a supervisory function unit 26 for inputting/outputting detection signals, control signals and setting signals to/from the first and second EO/OE converters 21 and 22 and the various devices 25, and an ONU function section 27 for inputting/outputting electrical signals between the electrical signal connector 24 and the supervisory function unit 26.

The first EO/OE converter 21 converts an optical signal transmitted downward from the OLT 1 of the center side through the optical fiber 2 into an electrical signal, performs a predetermined process such as 3R or 2R on the electrical signal, outputs the electrical signal to the electric line 23, and, at the same time, converts an electrical signal transmitted upward from the second EO/OE converter 22 through the electric line 23 into an optical signal and outputs the optical signal to the optical fiber 2.

The second EO/OE converter 22 converts an electrical signal transmitted downward through the electric line 23 into an optical signal, outputs the optical signal to the optical filter 3 on the side of the subscriber, converts an optical signal transmitted upward through the optical fiber 3 into an electrical signal, performs a predetermined process such as 3R or 2R on the electrical signal and outputs the electrical signal to the electric line 23.

The electrical signal connector 24 branches electrical signals of TDM multi-channels according to the PON protocol which are transmitted downward through the electric line 23, transfers the branched signals to the first EO/OE converter 21 and the ONU function section 27 multiplexes signals of TDM multi-channels according to the PON protocol which are transmitted from the ONU function section 27 into an electrical signal and transfers the electrical signal upward to the electric line 23.

The supervisory function unit 26 receives state monitoring signals from the first and second EO/OE converters 21 and 22 or signals from the various devices 25, and outputs signals for controlling or setting the first and second EO/OE converters 21 and 22 and the devices included in the various devices 25.

The supervisory function unit 26 includes a CPU and a memory and can be connected to the OLT 1 via the ONU function section 27 by using a repairing channel according to PON protocol. Otherwise, the supervisory function unit 26 can be LAN-connected to the OLT 1 using a main signal channel according to the PON protocol by a LAN connecting function of the ONU function section 27.

The ONU function section 27 is connected to the electric line 23 according to PON interface protocol, identifies and extracts a signal of a predetermined channel corresponding to the ONU function section 27 from the signal of multi-channels transmitted downward through the electric line 23, processes the signal, transmits the processed signal to the supervisory function unit 26, and transfers a signal sent from the supervisory function unit 26 through a predetermined channel to the upward direction of the electric line 23. Specifically, the ONU function section 27 has the same configuration shown in FIG. 2, in which an optical transceiver 8a constituting the subscriber side ONUs 7-1 to 7-n with ONU function is omitted, and a channel different from channels for the ONUs 7-1 to 7-n is selected.

Figure 2:
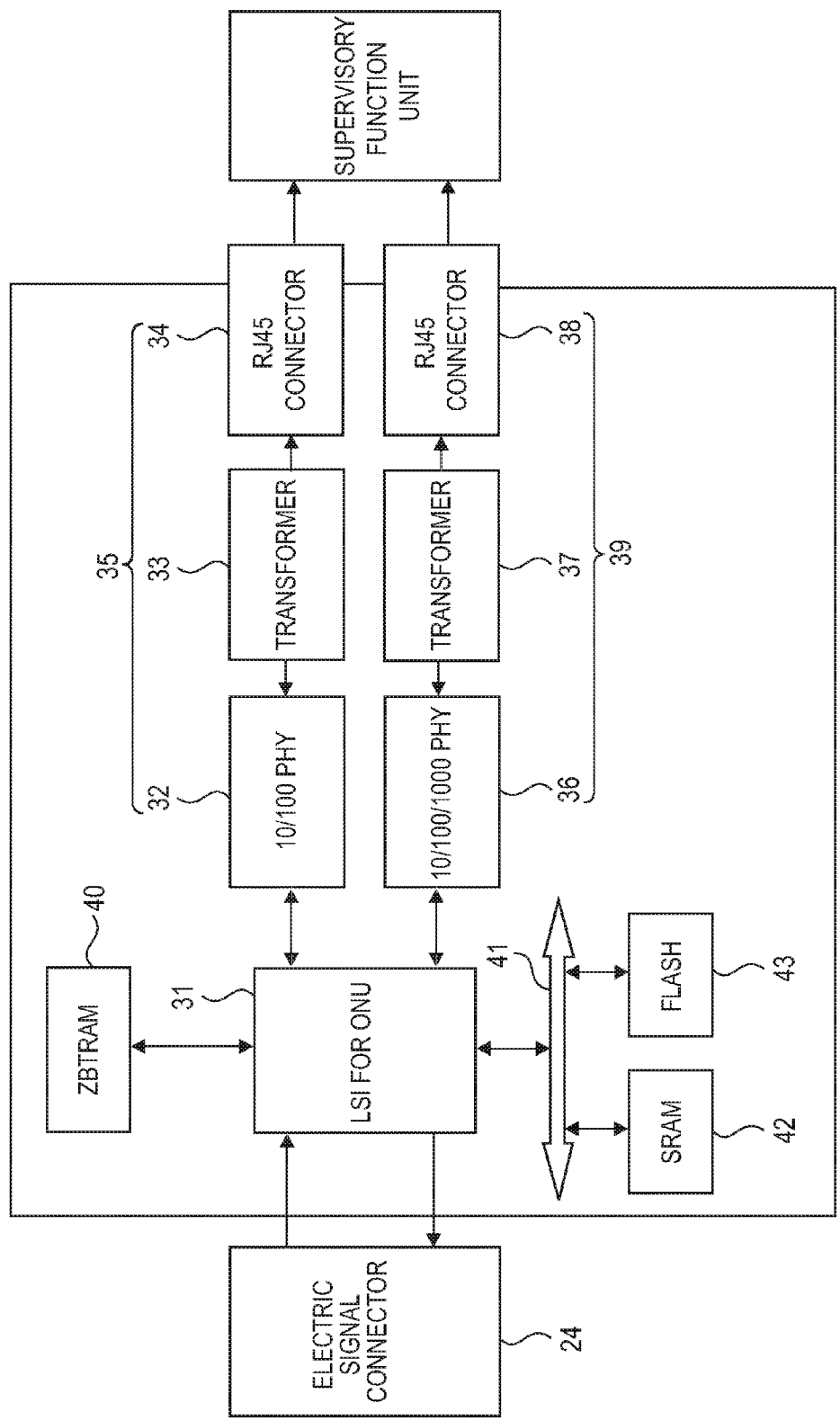
FIG. 2 is a block diagram showing a configuration of the ONU function section of the optical repeater used in the optical transmission system according to the first embodiment of the present invention.

Referring to FIG. 2, a LSI for PON processing 31 having input and output ports connected to the electrical signal connector 24 is connected to a first LAN interface 35 consisting of a 10/100 PHY controller 32, a transformer 33 and an RJ25 connector 24, a second LAN interface 39 consisting of a 10/100/1000 PHY controller 36, a transformer 37 and an RJ25 connector 38, ZBT-RAM 40 and a data bus 41. The data bus 41 is connected to an SRAM 42 and a flash memory 43, which stores programs etc. The RJ25 connector 38 is connected to the supervisory function unit 26 through a plug.

Figure 3:
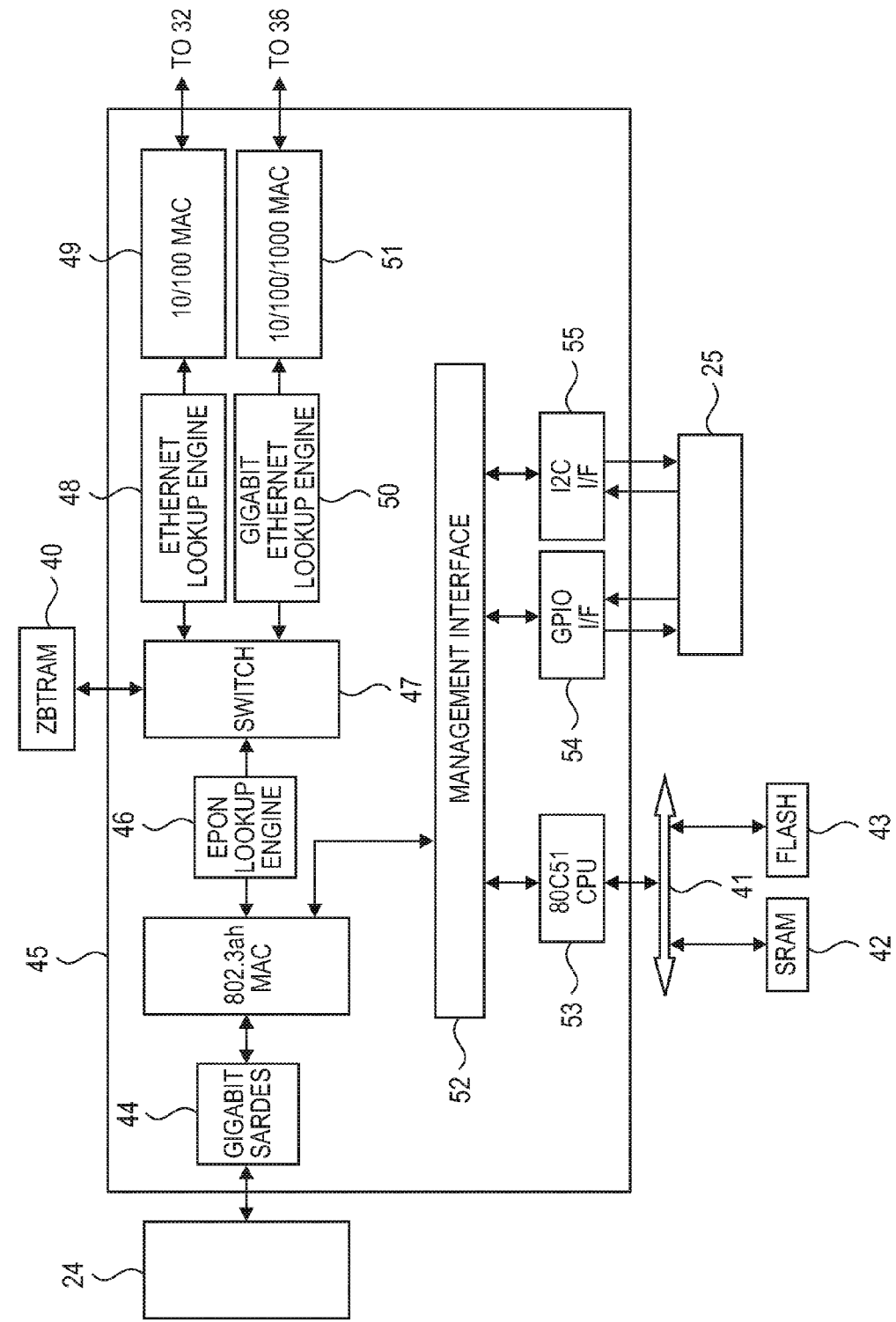
FIG. 3 is a block diagram showing a configuration of the LSI in the ONU function section of the optical repeater used in the optical transmission system according to the first embodiment of the present invention.
Figure 4:
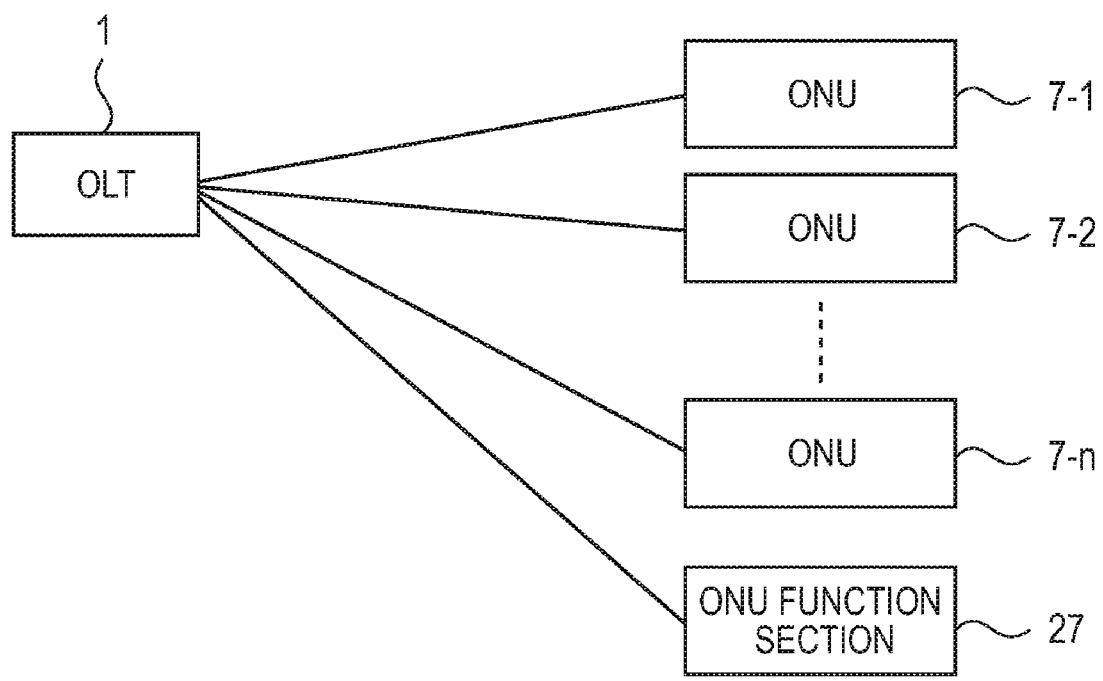
FIG. 4 is a block diagram showing the relationship between OLT side and ONU function in the optical transmission system according to the first embodiment of the present invention from the view-point of OLT.

Referring to FIG. 3, the LSI 31 includes an IEEE802.3ah based media access control (MAC) interface 45 connected to the electrical signal connector 24 via a gigabit serializer/deserializer (Gigabit SerDes) 44, an EPON (Ethernet passive optical network) lookup engine 46 connected to the MAC interface 45, a 10/100 MAC 49 connected to the EPON lookup engine 46 through a switch 47 and an Ethernet™ lookup engine 48, a 10/100/1000 MAC 51 connected to the EPON lookup engine 46 through the switch 47 and a gigabit Ethernet lookup engine 50, a management interface 52 connected to the MAC interface 45, an 80C51CPU 53 connected to the management interface 52, a GPIO interface 54, and an I2C interface 55.

The 10/100 MAC 49 is connected to the 10/100 PHY controller 32 and the 10/100/1000 MAC 51 is connected to the 10/100/1000 PHY controller 36. The 80C51CPU 53 is connected to the data bus 41.

Although the GPIO interface 54 can be connected to the various devices 25 through the supervisory function unit 26 having a CPU function to collect a device signal corresponding to a repeater supervisory signal, such as an alarm signal, it can be directly connected to the various devices 25 to collect the device signal corresponding to the repeater supervisory signal according to the types of the various devices 25 or the number of signals.

Similarly, the I2C interface 55 can be connected to the various devices 25 through the supervisory function unit 26 having the CPU function to collect the device signal corresponding to the repeater supervisory signal, such as an alarm signal. Otherwise, the I2C interface 55 can be connected with a temperature sensor (not shown), one of the various devices 25, via an analog-to-digital conversion board (not shown) having no CPU function to transmit temperature information as the repeater supervisory signal.

In FIG. 1, reference numeral 59 represents a supervisor connected to the OLT 1 and 60 represents a monitoring and operating equipment that inputs and/or outputs signals from/to the supervisor 59 to monitor and operate the optical repeater 4.

In the optical transmission system according to the current embodiment, upward optical signals from the ONUs 7-1 to 7-n to the OLT 1 are transmitted as follows.

Optical signals (burst signals) with a wavelength of 1.3 μm sent from the ONUs 7-1 to 7-n are multiplexed by the optical coupler 5 and transmitted to the second EO/OE converter 22 of the optical repeater 4 via the optical fibers 6-1 to 6-n and 3. In the optical repeater 4, data that represent operating states of the first and second EO/OE converters 21 and 22 or detection data from the various devices 25 is detected by the supervisory function unit 26, and transmitted to the electrical signal connector 24 through a predetermined channel.

The output signal from the ONU function section 27 is multiplexed to a predetermined channel of the upward electrical signal transmitted on the electric line 23 through the electrical signal connector 24, converted into an optical signal by the first EO/OE converter 21, output to the optical fiber 2 and received by the OLT 1. An optical signal of a predetermined channel among optical signals received by the OLT 1 is stored in the monitoring and operating equipment 60 via the supervisor 59 as supervisory data of the optical repeater 4. Downward optical signals output from the OLT 1 are transmitted to the ONUs 7-1 to 7-n as follows.

Optical signals with a wavelength of 1.49 μm sent from the OLT 1 are transmitted on the optical fiber 2 and input to the first EO/OE converter 21 of the optical repeater 4. A controlling/setting signal for monitoring the optical repeater 4 among the optical signals, which is output from the monitoring and operating equipment 60 to the supervisor 59, is output to the optical fiber 2 through a predetermined channel by the OLT 1.

The optical signals transmitted downwardly on the optical fiber 2 are input to the first EO/OE converter 21, converted into electrical signals thereby, output to the electric line 23, and can be divided into two paths, i.e. one path to the second EO/OE converter 22 and the other to the ONU function section 27 by the electrical signal connector 24.

The ONU function section 27 receives an electrical signal of a predetermined channel and outputs the electrical signal to the supervisory function unit 26. The supervisory function unit 26 performs controlling, setting and various detecting operations for the devices included in the first and second EO/OE converters 21 and 22 and the various devices 25 based on the electrical signal received from the ONU function section 27. The controlling/setting signal includes a signal for setting various parameters of the devices.

The electrical signal input from the electric line 23 to the second EO/OE converter 22 is converted into an optical signal, output to the optical fiber 3 and transmitted to the ONUs 7-1 to 7-n via the optical coupler 5. Each of the ONUs 7-1 to 7-n receives signal respectively allocated thereto by the ONU function sections 8b.

Optical signals are transmitted between the ONUs 7-1 to 7-n and the OLT 1 through the optical repeater 4 in a conventional manner and connected to an Internet line or a CATV center apparatus.

FIG. 2 logically shows the systemic function of the above-described optical transmission system. That is, the system has the configuration such that the protocol specification of the ONU function section 27 in the optical repeater 4 is the same as that of the ONU function section 8b in the ONUs 7-1 to 7-n, thus the operation performed between the OLT 1 and the ONUs 7-1 to 7-n can be used for ONU function section 27 to supervise the optical repeater. Accordingly, it is possible to supervise the optical repeater 4 efficiently which is connected on the optical transmission line between the OLT 1 and the ONUs 7-1 to 7-n for the purpose of lengthening the optical transmission distance of the PON type optical transmission system without using a new additional line and affecting the operation of the existing optical transmission system.

Second Embodiment

Figure 5:
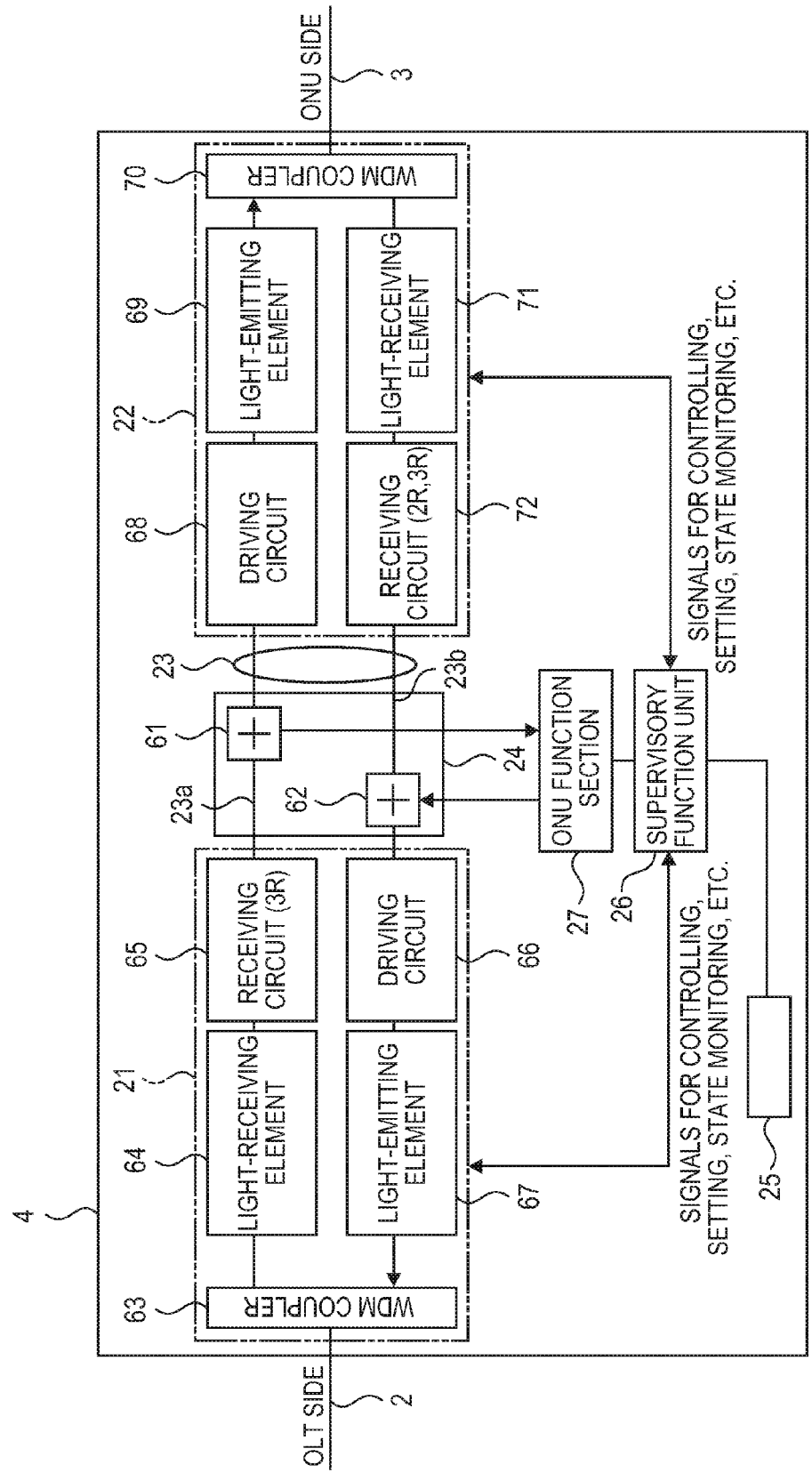
FIG. 5 is a block diagram showing a configuration of an optical repeater used in an optical transmission system according to a second embodiment of the present invention.

FIG. 5 is a block diagram of an optical repeater used in an optical transmission system according to a second embodiment of the present invention and shows the optical repeater 4 of FIG. 1 in more detail. Like reference numerals in FIGS. 1 and 5 denote like elements.

Referring to FIG. 5, the electric line 23 connecting the first and second EO/OE converters 21 and 22 includes a first electric line 23a for transferring electrical signals downward and a second electric line 23b for transferring electrical signals upward. A first electrical signal connector 61 for branching an electrical signal to the ONU function section 27 and a driving circuit 68 is connected to the middle of the first electric line 23a. A second electrical signal connector 62 for multiplexing an electrical signal of a predetermined channel output from the ONU function section 27 to an electrical signal transferred through the second electric line 23b is connected to the middle of the second electric line 23b. For example, a buffer IC is used as the second electrical signal connector 62.

The first EO/OE converter 21 includes a first WDM coupler 63 connected to the optical fiber 2 on the side of the OLT 1, a first light-receiving element 64 for receiving a downward optical signal branched by the first WDM coupler 63 and converting the downward optical signal into an electrical signal, a first receiving circuit 65 for performing a process such as 3R or 2R on the electrical signal output from the first light-receiving element 64, a first driving circuit 66 outputting a predetermined driving current based on an upward electrical signal from the second electric line 23b, and a first light-emitting element 67 outputting light generated according to the driving current input from the first driving circuit 66 to the optical fiber 2 via the first WDM coupler 63.

The second EO/OE converter 22 includes a second driving circuit 68 outputting a driving current based on a downward electrical signal from the first electric line 23a, a second light-emitting element 69 outputting light according to the driving current input from the second driving circuit 68, a second WDM coupler 70 outputting the light received from the second light-emitting element 69 to the optical fiber 3 on the side of subscriber, a second light-receiving element for receiving an upward optical signal transmitted from the optical fiber 3 through the second WDM coupler and converting the upward optical signal into an electrical signal, and a second receiving circuit 72 for performing a process such as 2R or 3R on the electrical signal output from the second light-receiving element 71 and outputting the electrical signal to the second electric line 23b. The first and second WDM couplers 63 and 70 can be configured in the form of a circulator or an isolator integrated with a 3 dB coupler.

The supervisory function unit 26 and the ONU function section 27 have the same configurations as those in the first embodiment.

In the optical transmission system comprising aforementioned optical repeater 4, similar to the system shown in FIG. 1, an optical signal sent from the OLT 1 of the center is transmitted through the optical fiber 2, is input to the first WDM coupler 63 included in the first EO/OE converter 21, and received by the first light-receiving element 64. The first light-receiving element 64 converts the received optical signal into an electrical signal and outputs the electrical signal to the first receiving circuit 65. Then, the first receiving circuit 65 performs 3R process on the electrical signal and outputs the signal to the first electric line 23a.

The electrical signal transmitted to the second EO/OE converter 22 through the first electric line 23a is branched toward two directions, i.e., to the second driving circuit 68 and the ONU function section 27 by the first electrical signal connector 61.

The second driving circuit 68 provides current according to the input electrical signal to the second light-emitting element 69 so that the second light-emitting element 69 emits light at a predetermined wavelength, for example, 1.49 μm. An optical signal output from the second light-emitting element 69 is input to the optical fiber 3 via the second WDM coupler 70, branched by the optical coupler 5, transmitted through the optical fibers 6-1 to 6-n and input to the plurality of ONUs 7-1 to 7-n.

The ONU function section 27 selects an electrical signal of a predetermined channel from electrical signals received from the first electrical signal connector 61 and outputs the selected electrical signal to the supervisory function unit 26. The supervisory function unit 26 not only controls and sets the outputs from the receiving circuits 35 and 42 or controls the temperature of a heater included in the various devices 25, but also acquires data of a temperature sensor, for example, such as a signal representing an abnormal temperature, or data of a device door opening/closing sensor, for example.

Optical signals output from the plurality of ONUs 7-1 to 7-n of the subscriber are multiplexed by the optical coupler 5, transmitted through the optical fiber 3 and applied to the second light-receiving element 71 via the second WDM coupler 70 in the second EO/OE converter. The second light-receiving element 71 converts the received optical signal into an electrical signal. The second receiving circuit 72 performs 2R or 3R process on the electrical signal and outputs the signal to the second electric line 23b.

While the electrical signal output from the second receiving circuit 72 is transmitted to the first driving circuit 66 of the first EO/OE converter 21 through the second electric line 23b, an electrical signal of a predetermined channel from the second electrical signal connector 62 is applied. This electrical signal of the predetermined channel is an output signal from the supervisory function unit 26 via the ONU function section 27 and is a supervisory signal based on detection signals from the various devices 25, the light-receiving elements 64 and 71 and the receiving circuits 65 and 72.

The second driving circuit 66 to which the electrical signal transmitted upwardly is applied through the second electric line 23b outputs a driving current to the light-emitting element 67. The light-emitting element 67 to which the driving current is applied converts the electrical signal into an optical signal with a wavelength of 1.3 μm and outputs the optical signal to the first WDM coupler 63.

The upward optical signal output from the first WDM coupler 63 is transmitted through the optical fiber 2 and arrives at the OLT 1 of the center, and data obtained based on the optical signal is monitored by the monitoring and operating equipment 60 via the supervisor 59.

According to the above-described optical repeater, the electric line 23 connects the first and second EO/OE converters 21 and 22, the first electrical signal connector 61 for branching an electrical signal is connected to the first electric line 23a which transfers electrical signals downward, and the second electrical signal connector 62 for multiplexing an electrical signal is connected to the upward second electric line 23b.

Accordingly, the system can be constructed in such a manner that the ONU function section 27 configured according to the same protocol specification as that used for the ONU function section 8b of the ONUs 7-1 to 7-n of the subscriber by connecting the same to the first and second electrical signal connectors 61 and 62, thus the operation performed between the OLT 1 and the OUNs 7-1 to 7-n can be used also for transmitting and receiving the control signal for supervising the optical repeater. Furthermore, since the interface for applying the signal for supervising the optical repeater 4 to the optical transmission line corresponds to the ONU function section 27 that processes electrical signals without using an optical transceiver, a simple electrical configuration can be achieved as compared to a case of applying an optical signal to an optical transmission line so that the cost required for constructing the system is reduced.

Third Embodiment

Figure 6:
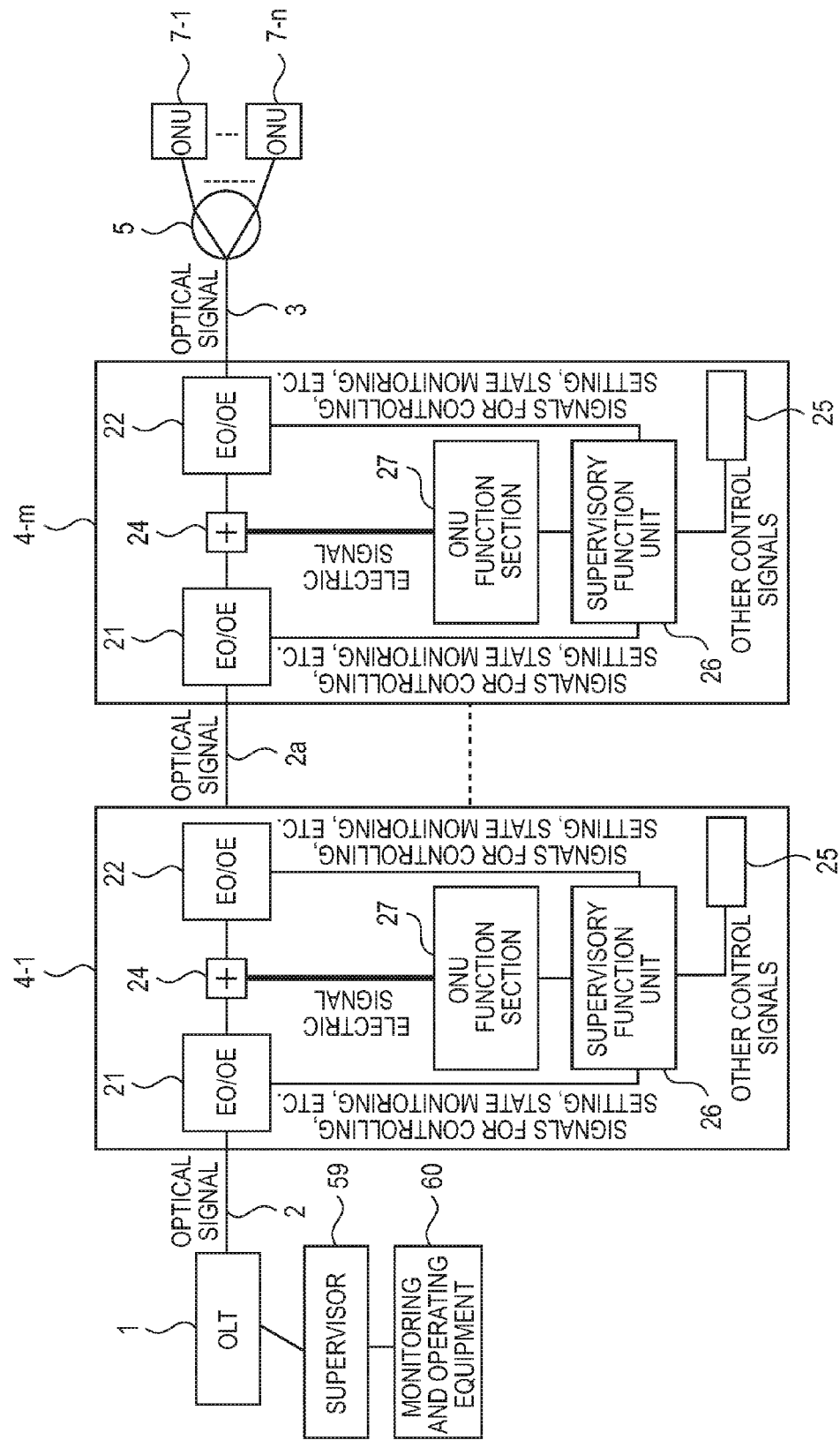
FIG. 6 illustrates a configuration of an optical transmission system according to a third embodiment of the present invention.

FIG. 6 illustrates an optical transmission system according to a third embodiment of the present invention. Like reference numerals in FIGS. 1 and 6 denote like elements.

Referring to FIG. 6, a plurality of optical repeaters 4-1 through 4-m having the same configuration as the optical repeater 4 illustrated in FIG. 1 are connected between the OLT 1 and the optical coupler 5. This embodiment can lengthen the optical transmission distance of the optical transmission system by increasing the number of optical repeater. In this case, there is no need to install an electric communication line for controlling the optical repeaters 4-1 through 4-*m* or install an optical transmission line with a wavelength different from that of the optical repeaters 4-1 through 4-*m* for controlling the optical repeaters, and thus it is possible to multiplex the control signal to the existing PON optical transmission line according to the ONU function section 27 processing electrical signals.

Figure 7:
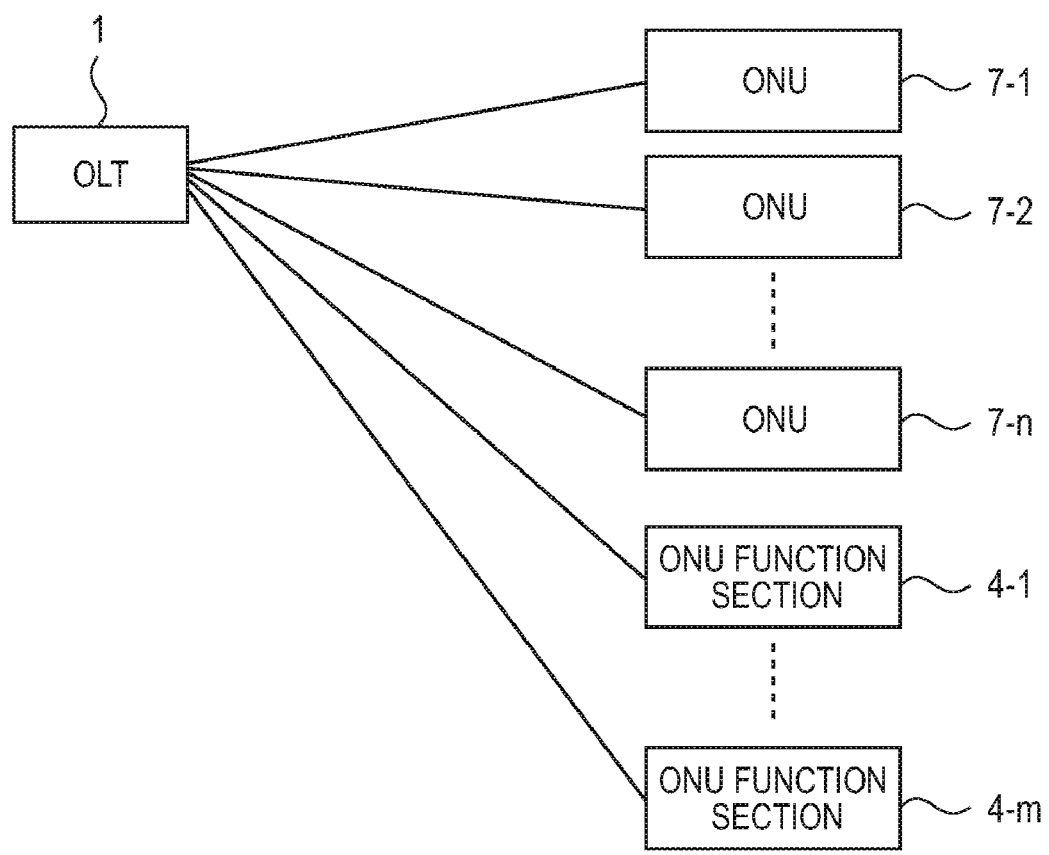
FIG. 7 is a block diagram showing the relationship between OLT side and ONU function in the optical transmission system according to the third embodiment of the present invention from the view-point of OLT.

The ONU function section 27 included in each of the optical repeaters 4-1 through 4-*m* is substantially identical to the ONU function section 8*b* of the ONUs 7-1 to 7-*n* of the subscriber homes. FIG. 7 shows a logical configuration of the optical transmission system of FIG. 6. That is, the ONU function section 27 included in each of the optical repeaters 4-1 through 4-*m* is logically configured according to the PON protocol specification, and thus it is possible to use operations of the OLT 1 and the ONUs 7-1 to 7-*n* for the ONU function section 27 of each of the optical repeaters 4-1 through 4-*m*. Optical signals used by the plurality of optical repeaters 4-1 through 4-*m* have different channels according to the ONU function sections 27 of the respective optical repeaters 4-1 through 4-*m*.

As described above, according to the optical repeater used in the optical transmission system according to the first, second and third embodiments of the present invention, components such as optical transceivers or couplers constituting ONUs of subscriber homes and optical coupling can be omitted according to ONU function using electrical signals. Furthermore, the ONU function section 27 for controlling the optical repeater, arranged in the optical repeater, can be constructed at a low cost by using the existing ONU function design or integrated circuit (IC) components. In addition, allowable optical loss of repeating is not reduced because the ONU function section 27 is not optically connected to the optical transmission line. Moreover, operations performed between the OLT and ONU function section can be used by electrically connecting the ONU function section to the optical transmission line.

Furthermore, according to the optical transmission system using the optical repeater, control of ONUs for user lines and control of the optical repeater can be easily integrated by easily connecting a function of supervising or controlling the optical repeater to PON line according to the PON protocol without using an additional control line because the optical repeater having the ONU function section connectable through an electrical signal is used between the OLT of the center and ONUs of subscriber homes.

Fourth Embodiment

Figure 8:
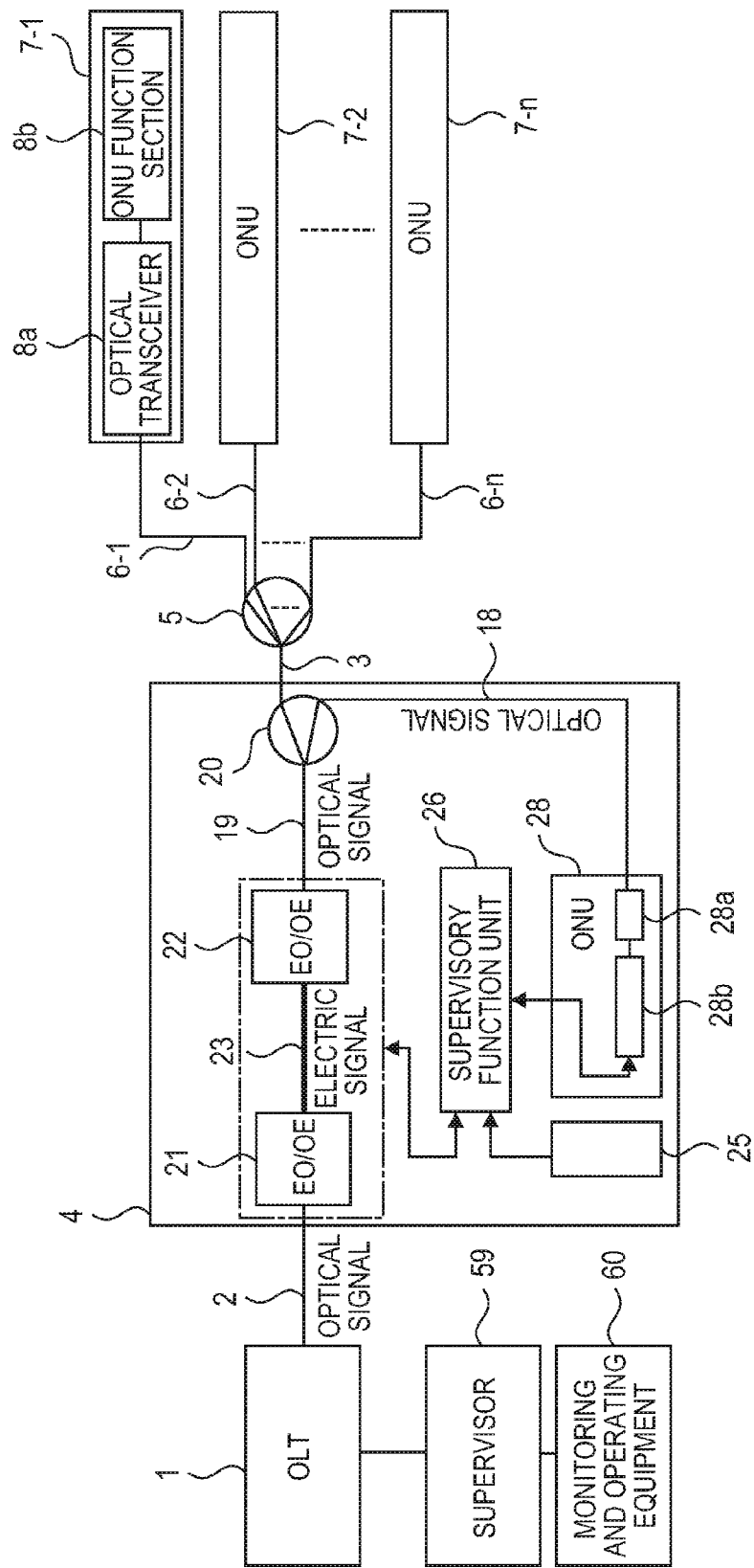
FIG. 8 illustrates a configuration of an optical transmission system according to a fourth embodiment of the present invention.

FIG. 8 illustrates a configuration of a PDS type optical transmission system according to a fourth embodiment of the present invention.

Referring to FIG. 8, the optical transmission line composed of the optical fibers 2 and 3 connected to the OLT 1 of the center side such as CATV is coupled to the first optical coupler (optical multiplexer/demultiplexer) 5 via the optical repeater 4. Optical transmission lines branched by the first optical coupler 5 are respectively connected to a plurality of ONUs 7-1 to 7-*n* (n is a natural number) of a plurality of subscriber through the optical fibers 6-1 to 6-*n*. Each of the ONUs 7-1 to 7-*n* includes the optical transceiver 8*a* and the ONU function section 8*b* connected to the optical transceiver 8*a*.

The optical repeater 4 includes the first EO/OE converter (electrical/optical conversion means) 21 connected to the optical fiber 2 on the side of the OLT 1, the second EO/OE converter (electrical/optical conversion means) 22 connected to the optical transmission line on the side of the first optical coupler 5, the electric line 23 transferring electrical signals between the first and second EO/OE converters 21 and 22, a second optical coupler (optical multiplexer/demultiplexer) 20 for downwardly branching an optical transmission line connected to an optical input/output port of the second EO/OE converter 22 through an optical waveguide or an optical fiber 19 to at least two channels and connecting the first channel to the optical fiber 3 on the side of subscriber, a ONU 28 for supervising optically connected to the downward second channel of the second optical coupler (optical multiplexer/demultiplexer) 20, various devices 25, such as a door opening/closing sensor, a temperature sensor, a power voltage sensor, an alarm, a heater, etc., and the supervisory function unit 26 that is connected to an electrical signal input/output port of the ONU 28 for supervising and inputs/outputs detection signals, control signals and setting signals for the first and second EO/OE converters 21 and 22 and the various devices 25.

The downward direction corresponds to a direction from the center to the subscriber and the upward direction corresponds to a direction opposite to the downward direction.

Figure 9:
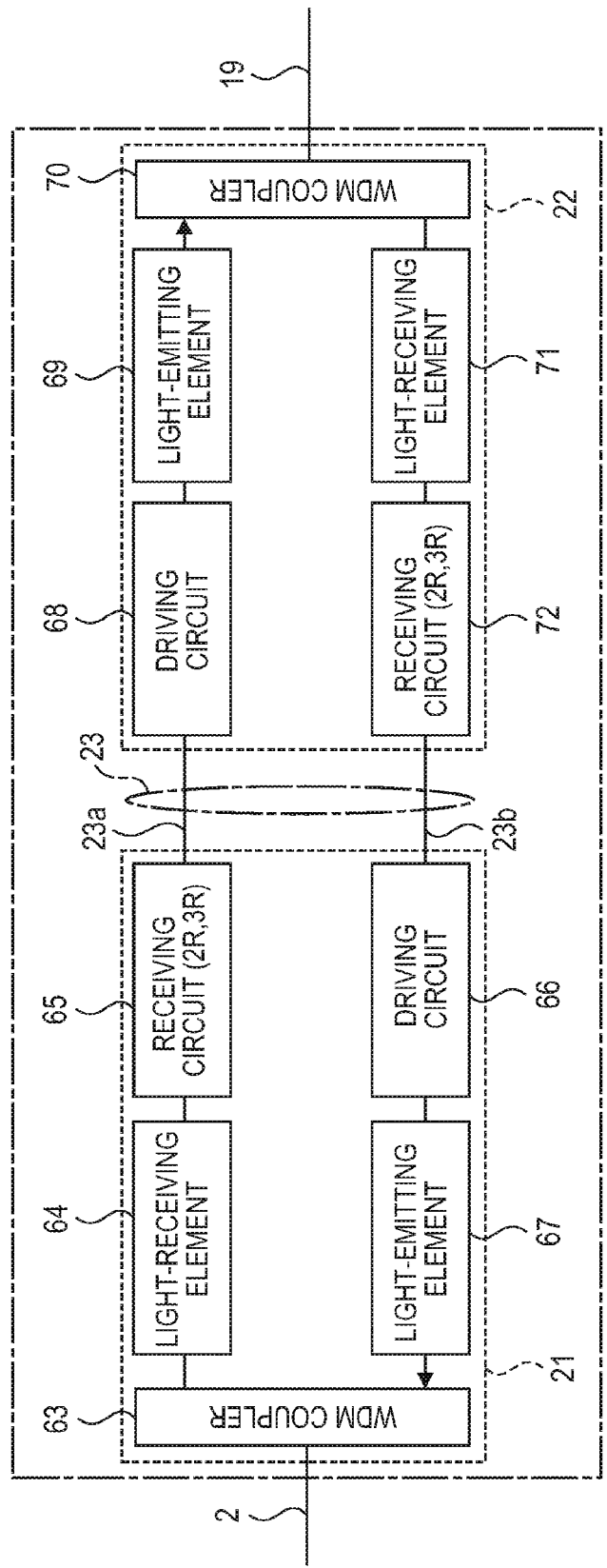
FIG. 9 is a block diagram of an optic-electric converter of an optical repeater used in the optical transmission system according to the fourth embodiment of the present invention.

The first and second EO/OE converters 21 and 22 and the electric line 23 for electrically connecting the first and second EO/OE converters 21 and 22 have the same configurations as those illustrated in FIG. 9.

Referring to FIG. 9, the electric line 23 for connecting the first and second EO/OE converters 21 and 22 includes the first electric line 23*a* for transmitting electrical signals upward and the second electric line 23*b* for transmitting electrical signals downward.

The first EO/OE converter 21 includes the first WDM coupler 63 connected to the optical fiber 2 on the side of the OLT 1, the first light-receiving element 64 converting a downward optical signal received through the first WDM coupler 63 into an electrical signal, the first receiving circuit 65 performing 3R or 2R process on the electrical signal output from the first light-receiving element 64, the first driving circuit 66 outputting a predetermined driving current based on an upward electrical signal from the second electric line 23*b*, and the first light-emitting element 67 outputting light generated by the driving current received from the first driving circuit 66 to the optical fiber 2 through the first WDM coupler 63.

The second EO/OE converter 22 includes the second driving circuit 68 outputting a predetermined driving current based on a downward electrical signal from the first electric line 23*a*, the second light-emitting element 69 outputting light by the driving current supplied from the second driving circuit 68, the second WDM coupler 70 outputting the light received from the second light-emitting element 69 to the optical fiber 19 connected to the second optical coupler 20, the second light-receiving element 71 receiving an upward optical signal transmitted from the second optical coupler 20 and converting the upward optical signal into an electrical signal, and the second receiving circuit 72 performing 2R or 3R process on the electrical signal output from the second light-receiving element 71 and outputting the electrical signal to the second electric line 23*b*. Here, 2R represents regeneration and retiming and 3R represents reshaping, regeneration and retiming.

Figure 10:
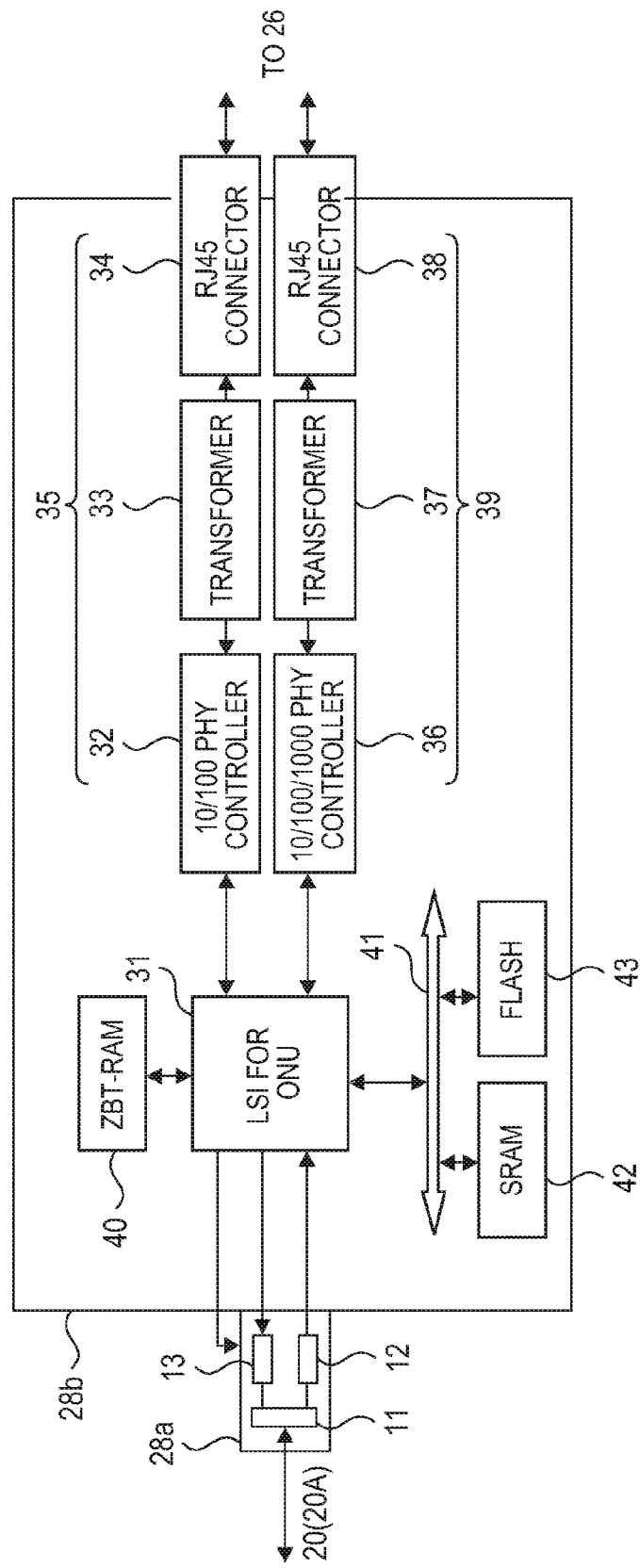
FIG. 10 is a block diagram of a control ONU in the optical repeater used in the optical transmission system according to the fourth embodiment of the present invention.

The ONU 28 for supervising is a device of PON interface protocol specification and has the same configuration as the ONUs 7-1 to 7-n of the subscriber. As shown in FIG. 10, the ONU 28 for supervising includes an optical transceiver 28a and an ONU function section 28b electrically connected to the optical transceiver 28a.

Referring to FIG. 10, the optical transceiver 28a includes a WDM unit 11 connected to an optical fiber 18 optically coupled to the second WDM coupler 70 through the second optical coupler 20, an optical/electrical converting circuit 12 having a light-receiving element (not shown) connected to one of optical waveguides branched by the WDM unit 11, and an electrical/optical converting circuit 13 having a light-emitting element (not shown) connected to the other optical waveguide branched by the WDM unit 11.

The ONU function section 28b is an electric circuit. The PON processing LSI 31 for ONU, which is included in the ONU function section 28b and has an input/output port connected to the optical/electrical converting circuit 12 and the electrical/optical converting circuit 13, is connected with a first LAN interface 35 consisting of a 10/100 PHY controller 32, a transformer 33 and an RJ25 connector 34, a second LAN interface 39 consisting of a 10/100/1000 PHY controller 36, a transformer 37 and an RJ25 connector 38, a ZBT-RAM 40, and a data bus 41. The data bus 41 is connected with an SRAM 42 and a flash memory 43. The flash memory 43 stores programs. A plug (not shown) connected to a control signal input/output port of the supervisory function unit 26 is inserted into the RJ45 connectors 34 and 38.

Even though it is not shown in the drawing specifically, device signals from the various devices 25, such as an alarm, may be electrically connected to a GPIO interface included in the LSI 31, and a temperature sensor among the various devices 25 may be electrically connected to an I2C interface included in the LSI 31 through an analog-to-digital conversion board.

The supervisory function unit 26 has a supervisory/controlling/setting circuit configuration for receiving state monitoring signals of the first and second EO/OE converters 21 and 22 or device signals of the various devices 25 and outputting signals capable of controlling the first and second EO/OE converters 21 and 22 and devices included in the various devices 25 or setting conditions.

In FIG. 8, reference numeral 59 denotes a supervisor connected to the OLT 1 and 60 denotes a Monitoring and Operating Equipment for receiving/outputting signals from/to the supervisor 59 to supervise and operate the optical repeater 4.

In the optical transmission system having the above-described optical repeater, optical signals with a wavelength of 1.3 μm sent from the ONUs 7-1 to 7-n of the subscriber through the optical fibers 6-1 to 6-n are multiplexed by the first optical coupler 5, transmitted to the optical fiber 3 and input to the optical repeater 4.

The optical signals input to the optical repeater 4 from the subscriber are multiplexed with an optical signal from the ONU 28 for supervising by the second optical coupler 20, transmitted through the optical fiber 19, converted into electrical signals by the second EO/OE converter 22, input to the first EO/OE converter 21 through the electric line 23, converted into an optical signal thereby and output to the optical fiber 2 connected to the OLT 1 side.

Namely, referring to FIG. 9, an optical signal input to the second WDM coupler 70 from the optical fiber 19 is converted into an electrical signal by the second light-receiving element 71, undergoes 2R or 3R process performed by the second receiving circuit 72, and is output to the first driving circuit 66 through the second electric line 23b. The first light-emitting element 67 is driven by driving current output from the first driving circuit 66, and an optical signal with a wavelength of 1.3 μm output from the first light-emitting element 67 is input to the optical fiber 2 through the first WDM coupler 63.

On the other hand, an optical signal with a wavelength of 1.49 μm output from the OLT 1 is transmitted through the optical fiber 2, input to the first EO/OE converter 21, converted into an electrical signal thereby, applied to the second EO/OE converter 22 through the electric line 23 and converted into the optical signal. The optical signal output from the second EO/OE converter 22 is transmitted to the second optical coupler 20 through the optical fiber 19.

More specifically, referring to FIG. 9, an optical signal input to the first WDM coupler 63 is converted into an electrical signal by the first light-receiving element 64, undergoes 3R or 2R process performed by the first receiving circuit 65, and is output to the second driving circuit 68 through the first electric line 23a. The second light-emitting element 69 is driven by driving current output from the second driving circuit 68 to output an optical signal to the optical fiber 19 via the second WDM coupler 70.

The optical signal transmitted downward from the optical fiber 19 is branched by the second coupler 20, and some of the branched optical signals are further branched by the first optical coupler 5 and transmitted to the ONUs 7-1 to 7-n of the subscriber through the optical fibers 6-1 to 6-n.

The supervisory function unit 26 in the optical repeater 4 transmits detection signals and signals representing abnormal states, which is received from the first and second EO/OE converters 21 and 22 and the various devices 25, to the ONU function section 28b of the ONU 28 for supervising as electrical signals. The ONU function section 28b performs process to make the received electrical signals to a predetermined channel, that is, an ONU logical channel corresponding to the control ONU and outputs to the optical transceiver 28a. The optical transceiver 28a converts the electrical signals into optical signals with a wavelength of 1.3 μm and outputs the optical signals to the second optical coupler 20 through a predetermined channel. The predetermined channel is a channel that is not selected by a subscriber.

An optical signal of a predetermined channel, input to the optical transceiver 28a, is multiplexed with optical signals transmitted from the subscriber by the optical coupler 20, transmitted to the second EO/OE converter 22 and sent to the OLT 1 through the electrical signal line 23, the first EO/OE converter 21 and the optical fiber 2.

A controlling/setting signal for supervising the optical repeater, which is an optical signal of a predetermined channel output from the monitoring and operating equipment 60 via the OLT 1 and the supervisor 59, is input to the first EO/OE converter 21 through the optical fiber together with other optical signals at a wavelength of 1.49 μm and converted into electrical signals by the first EO/OE converter 21, applied to the second EO/OE converter 22 through the electric line 23 and returned to optical signals by the second EO/OE converter 22. The optical signals output from the second EO/OE converter 22 are branched by the second coupler 20 and output to the ONU 28 for supervising and the first optical coupler 5.

The ONU 28 for supervising converts the received optical signals into electrical signals by the optical transceiver 28a and transmits the electrical signals to the ONU function section 28b. Then, the ONU function section 28b outputs a signal of a predetermined channel among the received signals to the supervisory function unit 26 as the controlling/setting signal.

The supervisory function unit 26 sets parameters of the various devices 25 to predetermined values based on the controlling/setting signal or controls the devices of the EO/OE converters 21 and 22. The control of the devices of the EO/OE converters 21 and 22 includes adjustment of optical output power of the light-emitting elements 67 and 69 and instruction signal to detect outputs of the light-receiving elements 64 and 71. The parameters of the various devices 25 include setting of the temperature of a heater or setting of the level of an alarm sound, for example.

Optical signals are transmitted between the ONUs 7-1 to 7-*n* and the OLT 1 through the optical repeater 4 in a conventional manner and connected to an Internet line or CATV center apparatus. In this case, optical signals of channels other than a predetermined channel used for the optical signal from the ONU 28 for supervising are selected in the ONUs 7-1 to 7-*n*.

Figure 11:
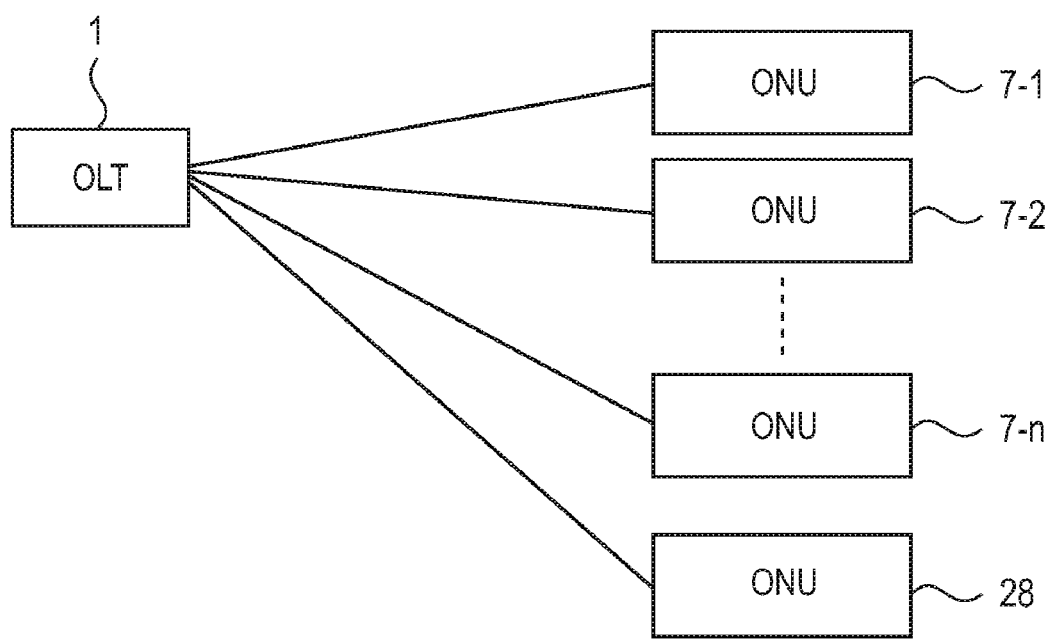
FIG. 11 is a block diagram showing the relationship between OLT and ONU function in the optical transmission system according to the fourth embodiment of the present invention from the view-point of OLT.

FIG. 11 logically illustrates the system function of the aforementioned optical transmission system. The ONU 28 for supervising of the optical repeater 4 and the ONUs 7-1 to 7-*n* of the subscriber can be configured according to the same protocol specifications, and thus the ONU 28 for supervising can use the operation performed between the OLT 1 and the ONUs 7-1 to 7-*n*.

Accordingly, the optical repeater 4, which is connected to the optical transmission line between the OLT 1 and the ONUs 7-1 to 7-*n* in order to lengthen the optical transmission distance of the PON type optical transmission system, can be supervised efficiently for the optical transmission line without using an additional new line and affecting the operation of the optical transmission system.

In this case, the second optical coupler 20 set in the optical repeater 4 requires at least two branch structures. Furthermore, it is desirable that an optical signal branched by the second optical coupler 20 has intensity such that an optical signal branched to the ONU 28 for supervising at the shortest distance from the second optical coupler 20 has minimum power, for example, 10%, considering a difference between transmission distances to the ONU 28 for supervising and the ONUs 7-1 to 7-*n* of the subscriber.

Figure 12:
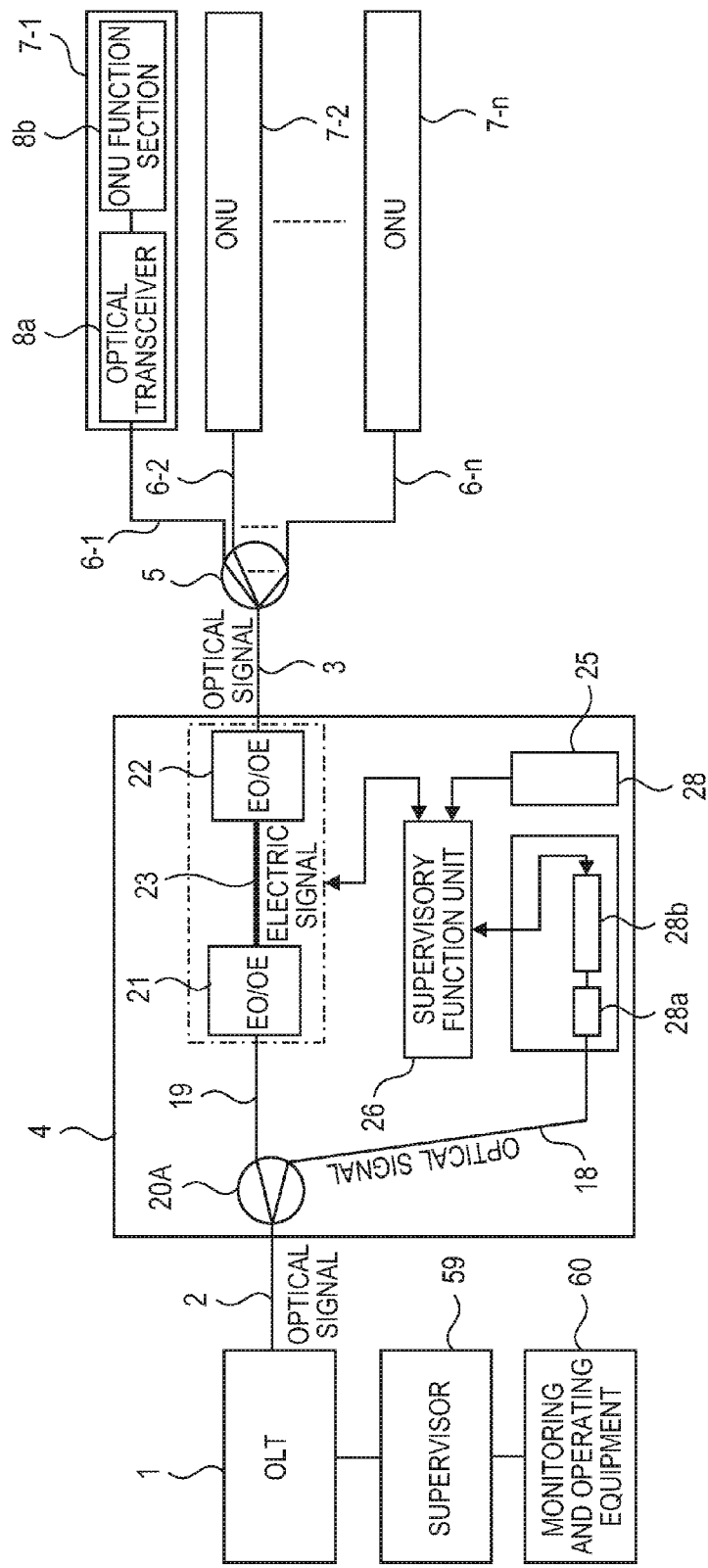
FIG. 12 is a block diagram of an optical repeater used in an optical transmission system according to a fifth embodiment of the present invention.

FIG. 12 is a block diagram showing a configuration of an optical transmission system according to a fifth embodiment of the present invention. The optical transmission system shown in FIG. 12 has the same configuration as the optical transmission system shown in FIG. 1 except the optical repeater. Like reference numerals in FIGS. 8 and 12 denote like elements.

Fifth Embodiment

Referring to FIG. 12, the optical repeater 4 includes a second optical coupler 20A connected to the optical fiber 2 coupled to the side of the OLT 1, the first EO/OE converter (electrical/optical conversion means) 21 connected to a first port of the second optical coupler 20A at a downward side, the second EO/OE converter (electrical/optical conversion means) 22 connected to the optical fiber 3 on the side of the subscriber, the electric line 23 transferring electrical signals between the first and second EO/OE converters 21 and 22, the ONU 28 for supervising optically connected to a second port of the second optical coupler 20A at the downward side, the various devices 25 connected to the optical repeater 4, and the supervisory function unit 26 that is connected to an electrical signal input/output port of the ONU 28 for supervising and inputs/outputs detection signals, controlling signals and setting signals for the first and second EO/OE converters 21 and 22 and the various devices 25.

The first and second EO/OE converters 21 and 22 and the electric line 23 connecting the first and second EO/OE converters have the same configurations as those in the first embodiment, shown in FIG. 9.

In the optical transmission system having the aforementioned optical repeater, optical signals with a wavelength of 1.3 μm sent from the ONUs 7-1 to 7-*n* of the subscriber are multiplexed by the first optical coupler 5 and input to the optical repeater 4 through the optical fibers 3 and 6-1 to 6-*n*.

The optical signals input to the optical repeater 4 from the subscriber are applied to the second EO/OE converter 22, converted into electrical signals thereby, input to the first EO/OE converter 21 through the electric line 23, converted into optical signals thereby and output to the second optical coupler 20A. The second optical coupler 20A multiplexes the optical signals output from the first EO/OE converter 21 with an optical signal of a predetermined channel output from the ONU 28 for supervising and transmits the combined optical signals to the optical fiber 2 coupled to the OLT 1 side.

Here, the signal output from the ONU 28 for supervising is based on an optical signal output from the supervisory function unit 26. That is, the supervisory function unit 26 transmits detection signals and signals representing abnormal states, received from the first and second EO/OE converters 21 and 22 and the various devices 25 which consist the optical repeater 4, to the ONU function section 28*b* of the ONU 28 for supervising. The ONU function section 28*b* transmits the received electrical signals to the optical transceiver 28*a* through a predetermined channel. The optical transceiver 28*a* converts the electrical signals received from the ONU function section 28*b* into optical signals and outputs the optical signals to the second optical coupler 20A.

On the other hand, an optical signal with a wavelength of 1.49 μm output from the OLT 1 is transmitted through the optical fiber 2, input to the second optical coupler 20A, branched thereby and sent to the first EO/OE converter 21 and the ONU 28 for supervising.

The optical signal input to the first EO/OE converter 21 is converted into an electrical signal thereby, input to the second EO/OE converter 22 through the electric line 23 and converted to the optical signal again. The optical signal output from the second EO/OE converter 22 is transmitted to the ONUs 7-1 to 7-*n* of the subscriber through the optical fiber 3 and the first optical coupler 5.

A controlling/setting signal for control, which is an optical signal output to the OEL 1 from the monitoring and operating equipment 60 via the supervisor 59, is input to the second optical coupler 20A from the OLT 1 through the optical fiber 2, branched by the second optical coupler 20A and input to the ONU 28 for supervising. The signal output from the OLT 1 may be based on a signal from a network.

The optical signal input to the ONU 28 for supervising from the second optical coupler 20A is converted into an electrical signal by the optical transceiver 28*a*. The ONU function section 28*b* outputs a signal of a predetermined channel to the supervisory function unit 26 as a controlling/setting signal for supervising. The supervisory function unit 26 sets parameters of the various devices 25 to predetermined values or controls the devices of the EO/OE converters 21 and 22 based on the controlling/setting signal for supervising.

The system function of the aforementioned optical transmission system is logically shown in FIG. 11. The ONU 28 for supervising of the optical repeater 4 can be configured according to the same protocol specifications as those used to configure the ONUs 7-1 to 7-*n* of the subscriber homes, and thus the ONU 28 for supervising can use the operation performed between the OLT 1 and the ONUs 7-1 to 7-*n*.

Accordingly, the optical repeater 4, which is connected to the optical transmission line between the OLT 1 and the ONUs 7-1 to 7-n in order to lengthen the optical transmission distance of the PON type optical transmission system, can be controlled efficiently for the optical transmission line without using an additional new line and affecting the operation of the optical transmission system.

The second optical coupler 20A set in the optical repeater 4 requires at least two branch structures. Furthermore, it is desirable that the intensity of an optical signal branched by the second optical coupler 20A is equally distributed to optical signals respectively branched by the second optical coupler 20A to the EO/OE converter 21 and the ONU 28 for supervising if the EO/OE converter 21 and the ONU 28 for supervising have the same minimum light-receiving level, considering that the optical signal is distributed to the EO/OE converter 21 and the ONU 28 for supervising and a maximum optical transmission distance between the OLT 1 and the optical repeater 4 is secured. For example, the intensity of the optical signal is distributed such that power of the optical signal branched to the EO/OE converter 21 corresponds to 50% and power of the optical signal branched to the ONU 28 for supervising corresponds to 50%.

Comparing the embodiments shown in FIG. 9 and FIG. 12, the embodiment shown in FIG. 12, in which the optical coupler 20 is not required to be connected to the output port of the second EO/OE converter 22, is suitable for the case that the optical fiber 3 requires a long transmission distance whereas the embodiment shown in FIG. 8 is suitable for the case that the optical fiber 2 requires a long transmission distance.

Furthermore, Comparing the embodiments shown in FIG. 8 and FIG. 12, when the EO/OE converters 21 and 22 of the optical repeater 4 is in trouble and do not operate properly, the optical signal 18 cannot be transmitted to the OLT 1 even if the ONU 28 for supervising operates properly in the embodiment shown in FIG. 8. However, information regarding the problem of the optical repeater 4 can be transmitted to the OLT 1 through the optical coupler 20A if the ONU 28 for supervising normally operates in the embodiment shown in FIG. 12.

Sixth Embodiment

Figure 13:
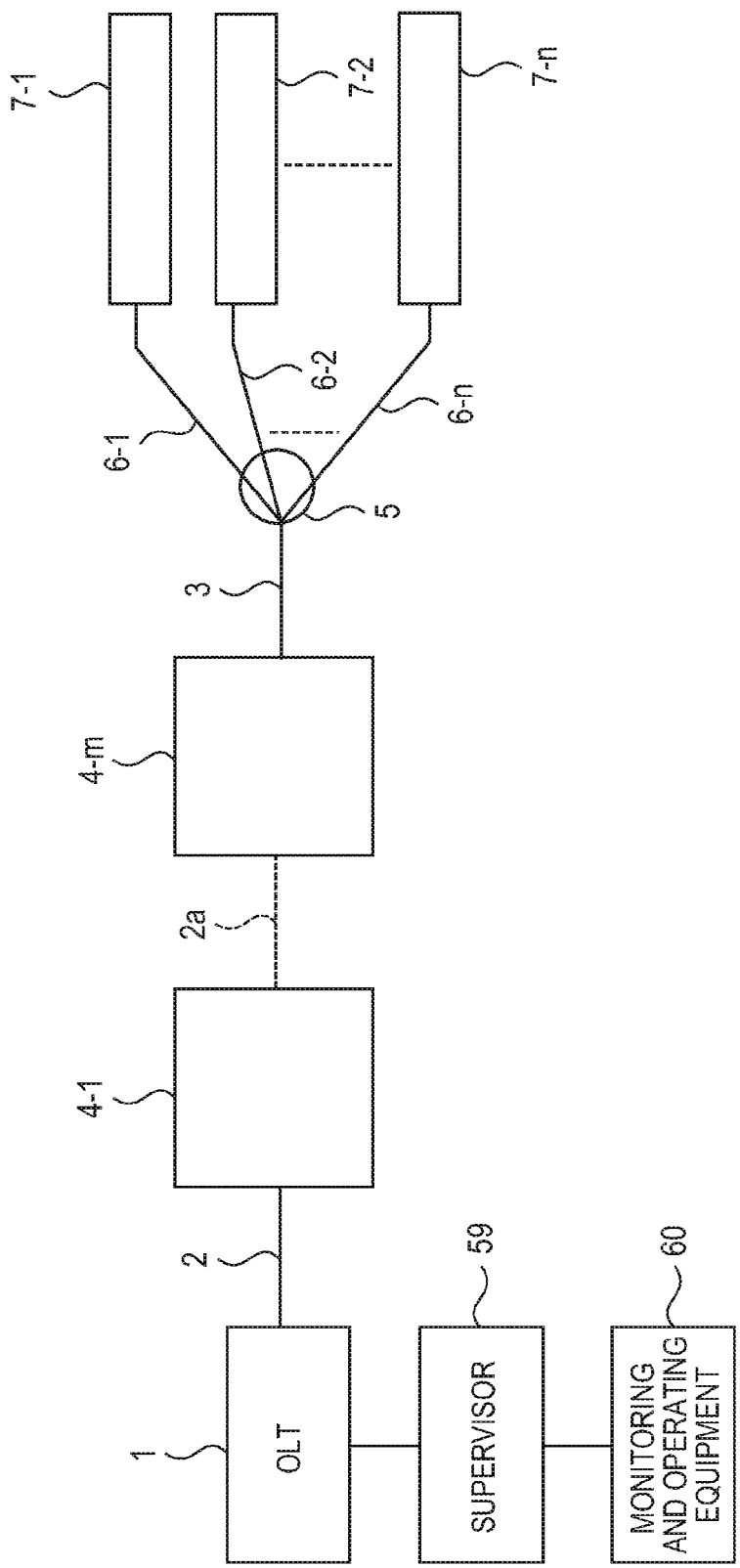
FIG. 13 is a block diagram of an optical transmission system according to a sixth embodiment of the present invention.

FIG. 13 illustrates a configuration of an optical transmission system according to a sixth embodiment of the present invention. Like reference numerals in FIGS. 8 and 13 denote like elements.

Referring to FIG. 13, a plurality of optical repeaters 4-1 through 4-m having the same configuration as the optical repeater 4 shown in FIG. 8 or 12 are connected between the OLT 1 and the optical coupler 5 through an optical fiber 2a at a distance from the OLT 1 and the optical coupler 5. In this case, the optical transmission distance of the optical transmission system can be lengthened by increasing the number of optical repeaters.

Accordingly, a signal for supervising the optical repeaters 4-1 through 4-m can be multiplexed to the existing PON optical transmission line by an ONU function section transferring electrical signals because an additional line for supervising the optical repeaters 4-1 through 4-m, such as an electric communication line or an optical interface, is not required.

Figure 14:
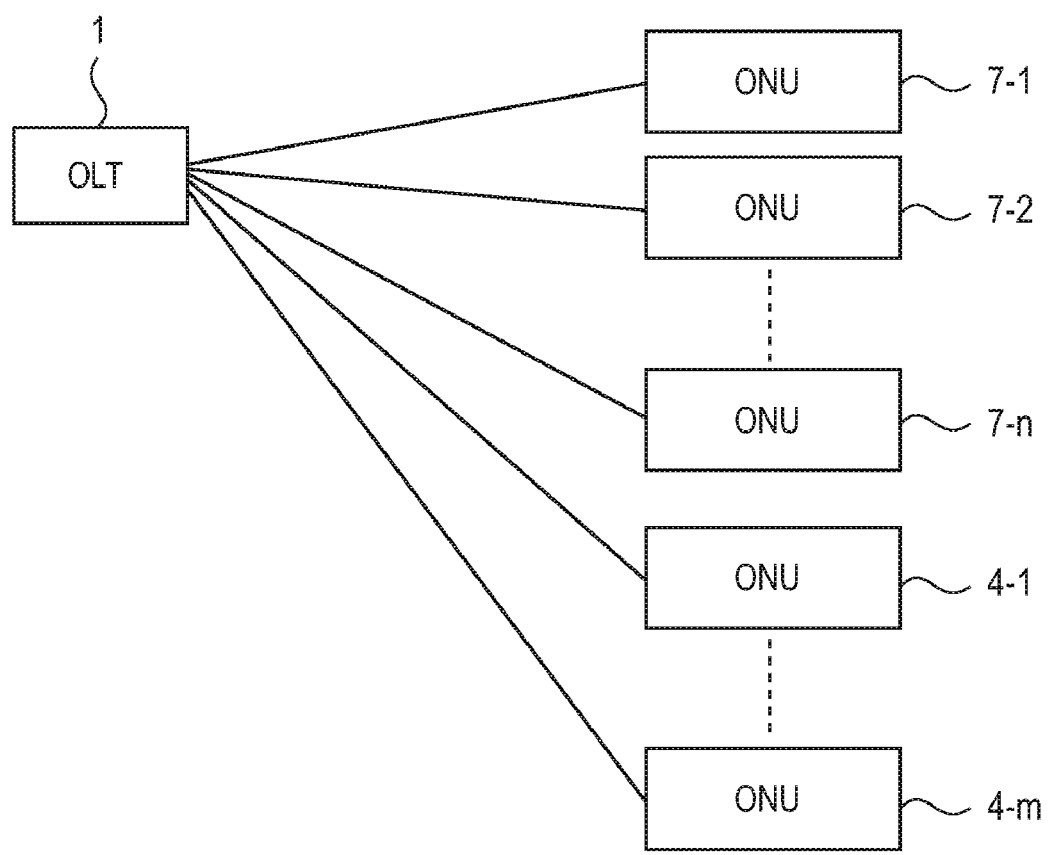
FIG. 14 is a block diagram showing the relationship between OLT and ONU function in the optical transmission system according to the sixth embodiment of the present invention from the view-point of OLT.
Figure 15:
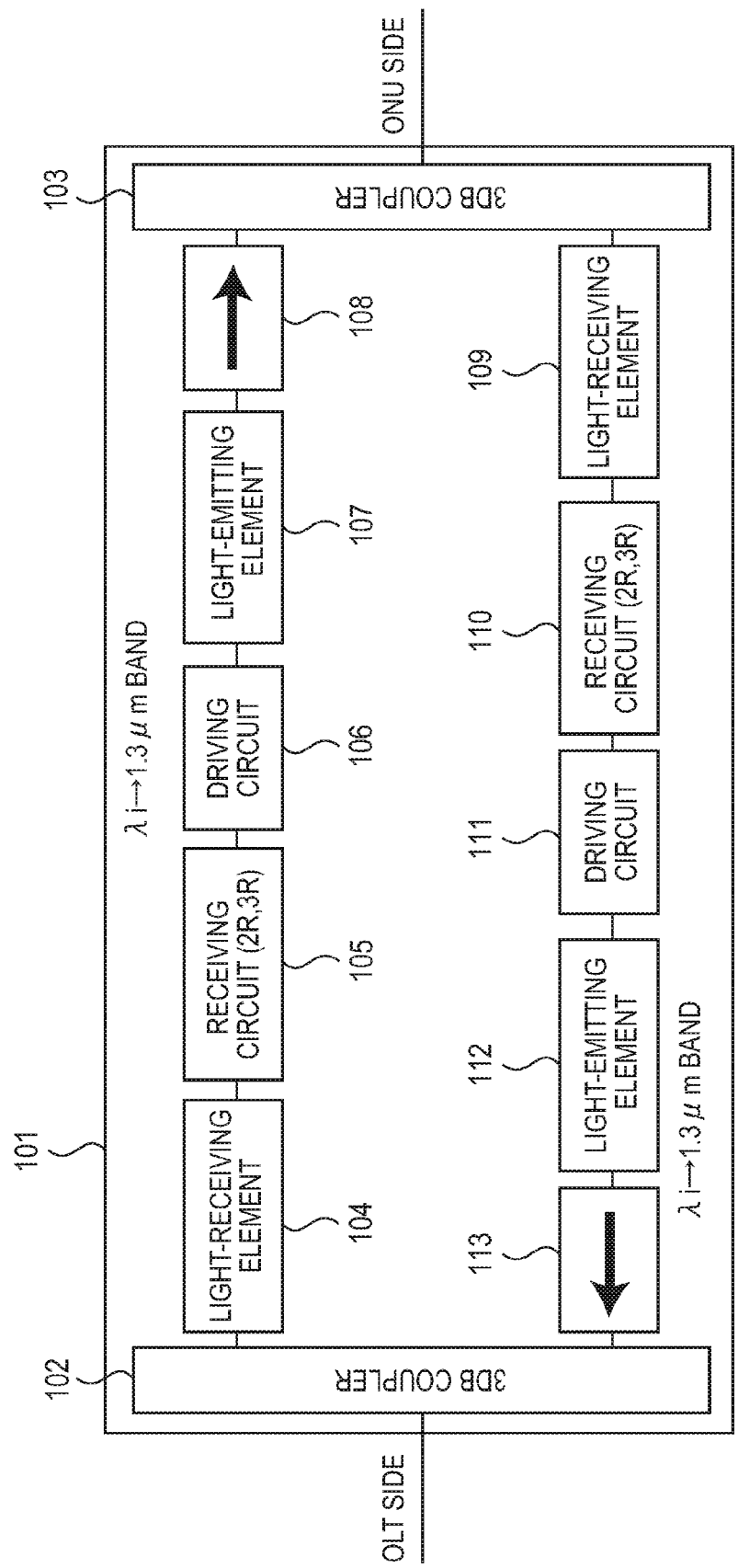
FIG. 15 illustrates an example of an optical repeater used in a conventional PON type optical transmission system.

The ONU function section 28 included in each of the optical repeaters 4-1 through 4-m is substantially identical to the ONUs 7-1 to 7-n of the subscriber side, and the logical configuration of the optical transmission system of FIG. 13 is illustrated as FIG. 14. That is, the ONU 28 for supervising included in each of the optical repeaters 4-1 through 4-m is logically constructed by the conventional PON protocol specification, and thus it is possible to use the operations of the OLT 1 and the ONUs 7-1 to 7-n.

As described above, according to the fourth to sixth embodiments of the present invention, optical signals transmitted between the OLT 1 and the first optical coupler 5 through the optical transmission lines 2 and 3 can be multiplexed or branched through the second optical coupler 20A or the optical coupler 20, and thus optical loss at the ONU 28 for supervising in the optical repeater 4 can be minimized (optimized). Accordingly, the ONU 28 for supervising can be configured after maximum allowable optical loss of the optical transmission line 2 or 3 for main signals is secured and operations between the OLT and ONU function section can be used.

Moreover, according to the optical transmission system using the optical repeater, the optical repeater 4 can be controlled by an optical signal having the same wavelength as that used for subscribers, and thus there is no need to install a new optical transmission line with a special wavelength or multiplex the optical signal with optical signals for subscribers using an optical signal processor having a different wavelength. In addition, it is possible to easily connect to PON line according to the PON protocol to easily combine the supervising of ONUs for user lines and the control of the optical repeater.

What is claimed is:

1. An optical repeater connected to an optical transmission line having first and second optical transmission lines between at least one optical network unit (ONU) on the side of a subscriber and an optical line termination (OLT) on the side of a center, comprising:
    an optical signal processor connected between a first optical transmission line on the side of the center and a second optical transmission line on the side of subscriber;
    an optical multiplexer/demultiplexer connected to said first or second optical transmission line; and
    an ONU for supervising connected to said first or second optical transmission line through said optical multiplexer/demultiplexer to input/output electrical signal for supervising.

2. The optical repeater according to claim 1, wherein said ONU for supervising has the same function as that of said subscriber side optical line termination.

3. The optical repeater according to claim 1, wherein said optical network unit for supervising is connected to either said first optical transmission line or said second optical transmission line via said optical multiplexer/demultiplexer.

4. The optical repeater according to claim 1, wherein said optical signal processor comprises:
    a first electrical/optical conversion means connected to said first optical transmission line on the side of the center for optical/electrical conversion as well as electrical/optical conversion;
    a second electrical/optical conversion means connected to said second optical transmission line on the side of the subscriber for optical/electrical conversion as well as electrical/optical conversion; and
    an electric line connected between said first electrical/optical conversion means and said second electrical/optical conversion means to transmit an electrical signal therebetween.

5. The optical repeater according to claim 4, wherein at least one of said first and second electrical/optical conversion means includes a processing circuit for reshaping, regeneration and retiming processes.

6. An optical transmission system comprising:
an optical repeater connected to an optical transmission line having first and second optical transmission lines between at least one optical network unit (ONU) on the side of a subscriber and an optical line termination (OLT) on the side of a center, the optical repeater comprising:
an optical signal processor connected between a first optical transmission line on the side of the center and a second optical transmission line on the side of subscriber;
an optical multiplexer/demultiplexer connected to said first or second optical transmission line; and
an ONU for supervising connected to said first or second optical transmission line through said optical multiplexer/demultiplexer to input/output electrical signal for supervising;
a first optical network unit in said center side optical line termination, which is connected to said optical repeater through said first optical transmission line; and
a second optical network unit in said subscriber side optical line termination, which is connected to said optical repeater through said second optical transmission line.

7. The optical transmission system according to claim 6, wherein a plurality of said second optical network units is connected to said second optical transmission line through an optical multiplexer/demultiplexer.

8. The optical transmission system according to claim 6, wherein a plurality of said optical repeater is connected through an optical transmission line.

9. An optical repeater connected to an optical transmission line having first and second optical transmission lines between at least one optical network unit (ONU) on the side of a subscriber and an optical line termination (OLT) on the side of a center, comprising:
means for processing an optical signal connected between a first optical transmission line on the side of the center and a second optical transmission line on the side of subscriber;
means for optical multiplexing/demultiplexing connected to said first or second optical transmission line; and
means for supervising connected to said first or second optical transmission line through said means for optical multiplexing/demultiplexing to input/output electrical signals for supervising.

10. The optical repeater according to claim 9, wherein said means for supervising has the same function as that of said subscriber side optical line termination.

11. The optical repeater according to claim 9, wherein said means for supervising is connected to either said first optical transmission line or said second optical transmission line via said means for optical multiplexing/demultiplexing.

12. The optical repeater according to claim 9, wherein said means for processing the optical signal comprises:
a first electrical/optical conversion means connected to said first optical transmission line on the side of the center for optical/electrical conversion as well as electrical/optical conversion;
a second electrical/optical conversion means connected to said second optical transmission line on the side of the subscriber for optical/electrical conversion as well as electrical/optical conversion; and
an electric line connected between said first electrical/optical conversion means and said second electrical/optical conversion means to transmit an electrical signal therebetween.

13. The optical repeater according to claim 12, wherein at least one of said first and second electrical/optical conversion means includes a processing circuit for reshaping, regeneration and retiming processes.

* * * * *